Patented July 9, 1935

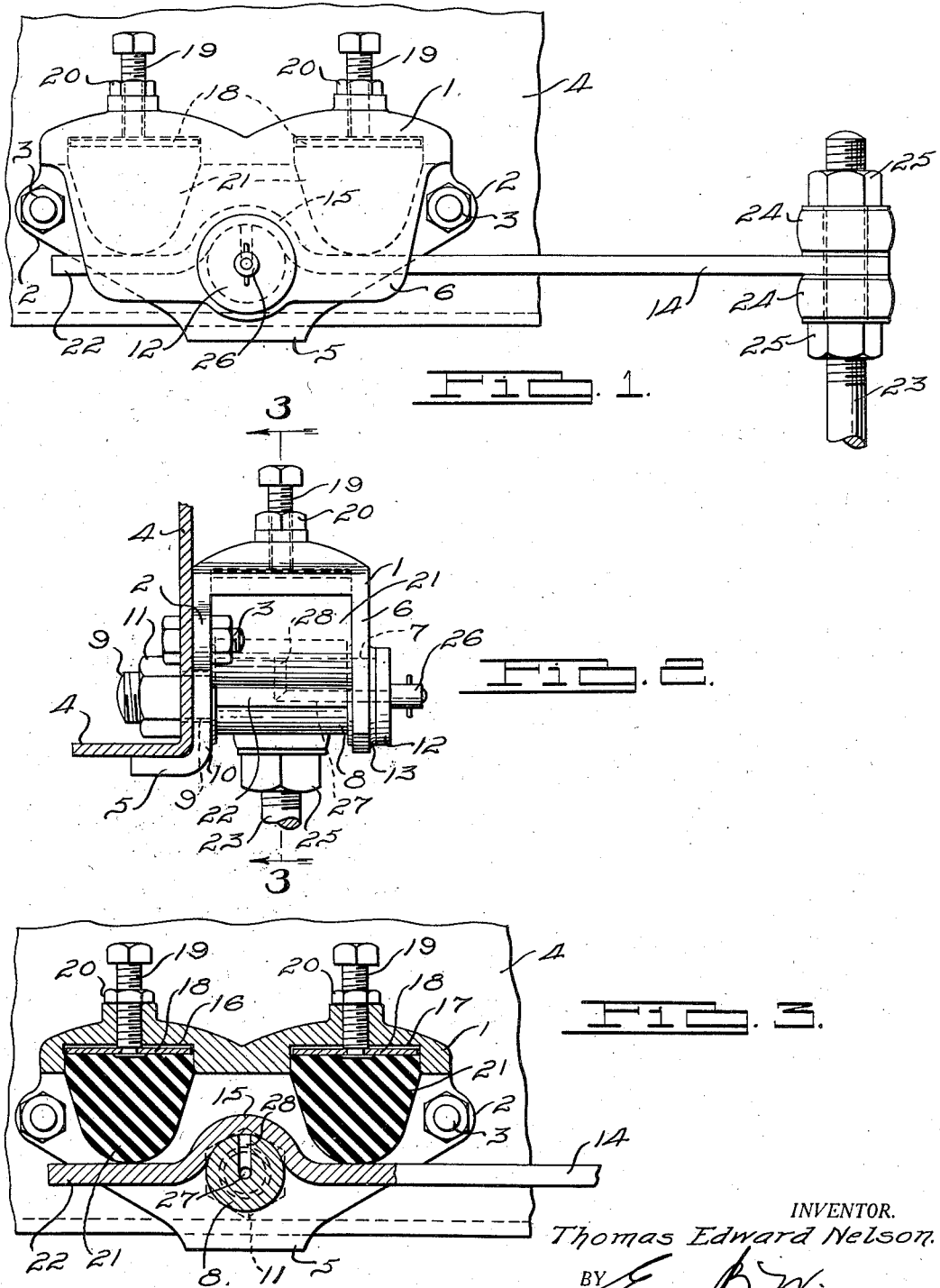

2,007,832

UNITED STATES PATENT OFFICE 2,007,832

SNUBBER

Thomas Edward Nelson, Pontiac, Mich., assignor to Victor E. Nelson, Pontiac, Mich.

Application January 2, 1934, Serial No. 705,037

2 Claims. (Cl. 267—21)

This invention relates to snubbers and the object of the invention is to provide a cheap and efficient snubber for automobiles which is of very simple construction.

One of the principal objects of the invention is to provide a snubber utilizing adjustable rubber cushions and a spring steel arm operating against the cushions to produce a snubber action.

Another object of the invention is to provide a spring steel arm which is mounted on a pivot pin and in which the movement of the arm in either direction is resisted by a rubber cushion.

Another object of the invention is to provide a snubber of the character described in which the pressure of the rubber cushions on the spring steel arm may be adjusted from the exterior of the snubber to produce the desired action.

A further object of the invention is to provide a snubber of the character described in which the rubber cushions form the end walls of the snubber housing and prevent dirt or foreign matter from entering the snubber from either end.

These objects and the several novel features of the invention are hereinafter more fully described and claimed and the preferred form of construction by which these objects are attained is shown in the accompanying drawing in which—

Fig. 1 is an elevation of a snubber embodying my invention as attached to an automobile frame.

Fig. 2 is an end view of the snubber taken from the left of Fig. 1.

Fig. 3 is a longitudinal section through the snubber taken on line 3—3 of Fig. 2.

As shown more particularly in Fig. 2, the snubber comprises an inverted U shaped housing 1 in which one flange of the U is provided with ears 2 having apertures through which bolts 3 may be inserted for securing the snubber to the automobile frame 4. The side of the housing provided with the ears 2 is also provided with an outwardly flared flange 5 at the bottom, as shown in Fig. 2, which extends beneath the automobile frame 4, as shown in Figs. 1 and 2. This flange together with the bolts 3 firmly secures the snubber housing to the automobile frame. As shown in Figs. 2 and 3, the outer flange 6 of the housing is provided with an aperture 7 to receive the pivot pin 8 and this pivot pin 8 is provided with an end 9 of smaller diameter which extends through the flange 10 of the housing and through the automobile frame and is provided with a nut 11 threaded on the end thereof. This pivot pin is provided with an enlarged head 12 which comes into contact with the boss 13 on the housing flange 6 as it is inserted to position. A spring steel arm 14 is provided, as shown more particularly in Figs. 1 and 3, and is formed to provide an off-set portion 15 of semi-circular shape and this portion is shaped to fit the circumference of the pivot pin 8, as shown in Fig. 3. The top of the housing is provided with recesses 16 and 17 and a plate 18 is mounted in the top of each recess and is adjustable by means of the respective adjusting screw 19 which may be secured in position by the respective lock nut 20. A wedge shaped rubber block 21 is mounted in each recess 16 and 17 and the top of each rubber block is rectangular in form while in cross section the lower end thereof is rounded, as shown in Figs. 1 and 3. These rubber blocks form the end walls of the housing so that dirt cannot enter the snubber from either end.

The spring steel arm 14 is provided with an integral extending end 22 and one rubber block 21 engages this end while the other rubber block engages the spring steel arm 14 on the opposite side of the pivot pin. As shown in Fig. 1, the extreme end of the spring steel arm 14 is apertured to receive the rod 23 which is connected to an adjacent part of the unsprung portion of the automobile, preferably the front or rear axle. An annular rubber pad 24 is provided above and below the end of the arm 14 and nuts 25 are provided to hold the rubber pads in place.

In assembly the rubber blocks 21 are mounted in position and the spring steel arm 14 is then moved up through the bottom of the housing to place a pressure on the rubber blocks 21 and the pivot pin 8 is then inserted to position and secured in place by the nut 11. At this time, the screws 19 may be adjusted to place the desired pressure on the rubber blocks 21 and on the arm 14. When so assembled, downward movement of the rod 23 produces upward movement of the end 22 of the spring arm 14 thus compressing the rubber block 21 at the left of the pivot pin shown in Fig. 3 and upward movement of the rod 23 produces upward movement of the arm 14 and compresses the rubber block 21 at the right of the pivot pin shown in Fig. 3. By this arrangement, upward or downward movement of the arm 14 is yieldably resisted by the rubber blocks and the screws 19 may be adjusted to properly control the bound and rebound. By making the arm 14 of spring steel, it will take care of excessive travel without bending or becoming distorted. The rubber pads 24 on the rod 23 yieldably impart the shock of the bound or rebound to the end of the spring steel arm 14. It will be noted that with this arrangement the rubber blocks are constantly worked which tends to make them long lived and the adjustment of the rubber blocks may be varied at any time by loosening the lock nuts 20 and adjusting the screws 19.

The pivot pin 8 may be provided with an oilless bearing on the outside between the pivot pin and spring arm and this will probably be the normal construction. However, if it is desired to provide lubrication at this point, a grease fitting 26 may be provided in the head of the pivot pin, as shown in Fig. 2, and the pivot pin 8 may be provided with a conduit 27 leading from the grease fitting and opening through a conduit 28 to the inner side of the portion 15 of the spring arm.

This snubber will require no re-charging and when an oilless bearing is provided about the pin 8 no lubrication is required. It may be easily assembled or disassembled for replacement of parts and may be readily adjusted at any time, though normally no adjustment is required over considerable periods of use. The snubber action is not changed by weather conditions and the device may be very cheaply made for production installation.

From the foregoing description, it becomes evident that the device is very simple and efficient in operation, will not easily get out of order, is composed of few parts and is of consequent low manufacturing cost and provides a device which accomplishes the objects described.

Having thus fully described my invention, its utility and mode of operation, what I claim and desire to secure by Letters Patent of the United States is—

1. In a snubber, an inverted U shaped housing having open ends, a pivot pin extending through the sides of the housing intermediate the open ends, a spring steel arm having an off-set portion fitting over the pivot pin and pivotally mounted thereon, a wedge shaped rubber block positioned between the arm and top of the housing on each side of the off-set portion of said arm, each wedge shaped block forming a closure for the respective end of the housing, a screw threaded through the top of the housing above each rubber block and adapted to be turned down to press the rubber block against the spring steel arm and a lock nut for locking each screw in position.

2. In a snubber, an inverted U shaped housing provided with a pair of recesses in the top, a pivot pin extending through the sides of the housing, a spring steel arm having an off-set portion fitting over the pivot pin and pivotally mounted thereon, a rubber block positioned between the arm and top of the housing on each side of said off-set portion, means for applying lubricant between the pivot pin and off-set portion of the spring arm and adjustable means for applying pressure to the rubber blocks.

THOMAS EDWARD NELSON.